United States Patent [19]

Popplewell

[11] 4,297,308

[45] Oct. 27, 1981

[54] METHOD OF MANUFACTURING GAMES RACKETS

[75] Inventor: Frank W. Popplewell, Essex, England

[73] Assignee: Dunlop Limited, London, England

[21] Appl. No.: 15,912

[22] Filed: Feb. 28, 1979

[30] Foreign Application Priority Data

Mar. 7, 1978 [GB] United Kingdom ............... 8925/78

[51] Int. Cl.³ .................. B29C 1/14; B29D 23/02; B29D 27/00

[52] U.S. Cl. .................................. 264/46.6; 264/250; 264/267; 264/317; 264/337; 273/73 C

[58] Field of Search ............ 264/221, 317, 46.6, 264/250, 267, 313, 337; 273/73 C

[56] References Cited

U.S. PATENT DOCUMENTS

| | | | |
|---|---|---|---|
| 1,401,567 | 12/1921 | Stratford et al. | 264/317 |
| 3,664,668 | 5/1972 | Held | 273/73 C |
| 3,752,478 | 8/1973 | Flak | 273/73 H |
| 3,882,220 | 5/1975 | Ryder | 264/221 |
| 3,892,831 | 7/1975 | Robin et al. | 264/103 |
| 3,981,504 | 9/1976 | Gugel | 273/73 F |
| 3,998,457 | 12/1976 | Dempsey et al. | 273/73C |
| 4,145,047 | 3/1979 | Nagamoto et al. | 273/73 F |
| 4,165,071 | 8/1979 | Frolow | 273/73 C |
| 4,194,738 | 4/1978 | Inoue et al. | 273/73 C |

FOREIGN PATENT DOCUMENTS

| | | |
|---|---|---|
| 1893026 | 5/1964 | Fed. Rep. of Germany . |
| 2251435 | 10/1973 | Fed. Rep. of Germany . |
| 2723628 | 8/1978 | Fed. Rep. of Germany . |
| 2276845 | 7/1974 | France . |
| 2311644 | 5/1975 | France . |
| 773971 | 5/1957 | United Kingdom ............... 264/317 |
| 828685 | 2/1960 | United Kingdom . |
| 1226808 | 3/1971 | United Kingdom . |
| 1312543 | 4/1973 | United Kingdom . |
| 1362116 | 7/1974 | United Kingdom . |
| 1366773 | 9/1974 | United Kingdom . |
| 1436755 | 5/1976 | United Kingdom . |

Primary Examiner—James B. Lowe
Attorney, Agent, or Firm—Stevens, Davis, Miller & Mosher

[57] ABSTRACT

The invention relates to games racket frames which are made from reinforced plastics material and have a hollow construction. The particular construction and method of the invention enable a satisfactory hollow product to be made by an injection moulding technique instead of the more laborious technique of building a suitable reinforced hollow construction around a mandrel.

The frame is a hollow injection moulding of reinforced thermoplastics material in which the walls (21A and 21B) at the outer and inner circumference of the head (21) are joined by support means (25) through which the stringing holes (23) pass. The support means are integrally formed during the moulding.

The method of the invention involves the use of a fusible core (10) which is shaped to provide the desired moulding with support means and which is melted out after the moulding is formed.

7 Claims, 10 Drawing Figures

METHOD OF MANUFACTURING GAMES RACKETS

This invention relates to rackets for use in games, for example tennis, squash and badminton, and is particularly concerned with the construction of the frames of these rackets.

Racket frames have traditionally been made of wood and a modern wooden racket frame is a quite complicated construction containing many layers or laminations which have to be bonded together. The manufacture of such a frame is a skilful and time-consuming process. However, despite the difficulties of manufacture, which do not readily lend themselves to modern continuous manufacturing techniques, wooden rackets are still widely popular because of their overall combination of desirable playing characteristics. They provide high strength at the required weight for the particular sport and give desirable, if difficult to define, dynamic properties including "feel" and "control" which are necessary for the player to exercise his skill.

Substitute materials for wood have been proposed, notably metals and reinforced plastics materials. However, due to the considerably higher specific gravity of such materials (wood has a specific gravity of about 0.7 to 0.8, metals and reinforced thermoplastics materials suitable for racket construction have higher specific gravities considerably in excess of 1.0), it has been necessary to develop frame constructions based on hollow structural members otherwise weights would be unacceptable. Such hollow structural members may be produced by drawing or extruding processes in the case of metals or, in the case of reinforced plastic materials, by laminating processes around lightweight core materials, e.g. plastics foam, or by using hollow-moulding techniques, e.g. inflation moulding.

The present invention is directed to racket frames formed from reinforced plastics material and before proceeding further it is necessary to describe briefly the two basically different types of reinforced plastics materials which are available for racket frame manufacture.

1. Continuous filament/resin matrix system

The most usual type is based on the use of substantially continuous filaments of reinforcing material which are either incorporated into a woven fabric or braid or alternatively aligned uni-directionally in what is commonly referred to as a 'warp-sheet' or 'warp strip'. Such fabrics, braids, sheets or strips are usually made from glass or carbon fibre and are impregnated, usually with a thermosetting resin of the epoxy, polyester or phenolic type, either before or during the operation of fabricating the article in question. The resulting structure is then subjected to heat and pressure to cure the resin and to mould the article to the desired configuration.

Where it is necessary for a strong, lightweight article to be produced, as in the case of a racket frame, the reinforced plastics material is often formed around a core structure which is capable of being expanded in the moulding process so that the article is satisfactorily consolidated. The core may be in the form of an expandable plastics material or alternatively it may be formed by an inflation tube (made from, for instance, silicone rubber) which may subsequently be removed from the moulded article. By either means, a strong light racket frame may be produced but assembly of the article prior to moulding is somewhat complicated and leads to high labor cost in volume manufacture. Other disadvantages are that the thermosetting resins employed require to be subject to several minutes at an appropriate elevated temperature for curing to take place and large quantity manufacture therefore requires the use of a multiplicity of moulds.

2. Short filament or "chopped fibre"/resin matrix system.

The second class of reinforced plastics materials suitable for use in racket frames are those in which the reinforcement consists of short discrete lengths of fibre reinforcing material which are randomly dispersed in a resin matrix. The resin may be either of the thermoplastic or thermosetting type. The term thermoplastic is used to refer to a plastics material which softens and flows readily at elevated temperatures but which assumes a rigid form at ambient temperatures. Examples of such thermoplastics are nylon, polycarbonate, polyphenylene oxide, acetal and other so called 'engineering thermoplastics'. The reinforcement material is usually glass or carbon fibre where high strength is required. The thermosetting resins may for example be of the epoxy, polyester or phenolic types as described in Class (1) above.

Materials of the second class may be employed in a so-called injection-moulding process. In the case of the thermoplastic material, it is heated in the barrel of an injection-moulding machine until it softens and then it is forced under high pressure into a cold mould, wherein it cools and solidifies to assume the shape of the mould. In the case of the thermosetting material, injection of the substantially free-flowing material takes place into a heated mould, where curing subsequently takes place.

The injection-moulding process as described above is a considerably faster process than the fabricating/moulding process employing continuous filament/thermosetting resins described previously. Also, labor cost is considerably reduced.

Injection-moulding processes have been used to produce racket frames from reinforced thermoplastics materials. Although these rackets have met with some success commercially, they do not have the high stiffness and strength at sufficiently low weight that is desired for a really high quality racket. These known thermoplastic rackets have been formed with a head portion which is not hollow and their strength to weight or stiffness to weight ratios have been less than desirable for high quality rackets. Thus these rackets have been less stiff and strong than those made from continuous filament materials and thermo-setting resins as described in the first class above.

Although improving the strength and stiffness to weight ratios by making the head portion of a racket frame hollow is an obvious desideratum, it has not insofar as the applicant is aware previously been possible to satisfactorily achieve this in the form of a one-piece, i.e. integral, injection-moulding and the present invention is directed to that end.

Thus it can be seen that, in order to optimize weight and strength characteristics, it is advantageous to utilize a hollow plastics frame construction but satisfactory hollow frames have had to be made by somewat laborious methods of fabrication. One method of fabrication is, as indicated above, to assemble the filament/matrix system of Class 1 around a suitable core. An alternative method is to injection mould separate components of the above Class 2 materials and to join together these components to form the desired hollow section. The present invention is directed to providing a hollow plastics racket frame that can have the required combination of weight and strength of a high quality racket and which is made by moulding plastics materials of the second class described above in a single step, i.e. it is made in the form of an integral moulding.

Accordingly in one aspect the invention provides a games racket frame comprising a head and a shaft, at least the head being a hollow injection moulding of thermoplastics material reinforced with short filament reinforcing material, as defined above, and in which the wall of the moulding which lies at the center circumference of the head is joined to the wall which lies at the inner circumference of the head by an internal support means and the stringing holes in the head pass through the support means, the walls and support means of the moulding being integrally-formed.

In another aspect the invention provides a game racket comprising a strung frame of the type of the immediately preceding paragraph.

The support means is preferably a row of centrally-disposed hollow pillars, the row extending around the head portion of the frame. The axis of each pillar preferably lies in the plane of the strings of the racket and preferably is normal to the tangent to the circumference of the head at that point. However, if desired the axes of the pillars could lie at angles other than normal to that tangent and could, for example, be aligned with the direction of the strings. The pillars are hollow so that each can provide a hole running from the outer circumference to the inner circumference of the head of the frame. The holes through the pillars thus conveniently provide the stringing holes for the frame.

In an alternative embodiment, each pillar may be in the form of an abutment from one or other of the sidewalls of the moulding, and preferably adjacent pillars project from opposite walls. By sidewalls is meant those portions of the frame wall that constitute one or other of the two visible faces of the racket when it is viewed from the front or rear at right angles to the plane of the strings.

The transverse sectional shape of the frame may be any desired shape, for example circular, oval or rectangular. The latter is preferred as its box-like section can give very high stiffness and strength to weight ratios. It is found advantageous to form in the outer face of the wall of the frame which is to lie on the outer circumference of the head a longitudinally extending groove or channel to recess the strings of the racket and safeguard them from abrasion. The transverse sectional shapes referred to immediately above, therefore, include those shapes when such a groove or channel is incorporated.

Suitable thermoplastic materials from which the frame may be moulded include polyamides, polycarbonate, acrylonitrile-butadiene-styrene (ABS), acetal resins and poly(phenylene oxide) (PPO). (So-called 'modified' grades of PPO are now commercially available that are especially designed for injection-moulding applications).

The plastics material used is preferably reinforced with glass fibres or carbon fibres. Carbon fibres are the preferred reinforcing means and injection mixtures containing from 10% to 40% by weight of carbon fibre are especially preferred. Mixtures of glass and carbon fibres may also be used.

The wall thickness of the hollow frame of the invention need not be the same throughout and in fact the ability to vary the thickness may be a useful advantage. Zones of greater or lesser thickness may be utilized in order to optimize the required strength/weight and balance characteristics. For example, the wall thickness may be increased in the shoulder areas of the frame where considerable stress arises in use or similarly the thickness may be increased at the top of the head loop to improve impact-resistance. However, a better way of varying these characteristics around the frame is to vary the section of the frame rather than the wall thickness, particularly as there will be advantages in the moulding process and in the later annealing stages if the moulding has a substantially uniform wall thickness.

The actual dimensions of the hollow section used will depend of course on the type of racket, e.g. whether for tennis, squash or badminton, and similarly the wall thickness will be governed by strength and weight requirements for the particular game. The average skilled man of the art will readily be able to decide suitable dimensions for his particular requirements. As an example only, a useful wall-thickness may be 2 mms.

The moulded racket frame can advantageously be foam-filled by injecting the hollow moulding with a suitable foam or foam-precursor. Such foam-filling techniques are well known in the art. The foam is preferably a rigid foam and rigid polyurethane is especially preferred. The foam-filling acts to improve damping of the frame in use and also acts as a subsidiary internal support means. By varying the density of the foam it is possible to vary the weight of any particular frame moulding. One advantage of this is that it enables economical use of expensive materials in that the weight of the expensive plastics material/fibre matrix of the frame can be minimised and the desired frame weight reached by using a heavier but relatively cheap foam.

Another advantage of the foam-filling is that it will seal in any loose particles found inside the hollow frame. Such particles may be, for example, of metal when the frame is made by a low-melting point metal core technique described below. In this technique the core is melted out from the moulded frame but it is quite possible that not all the liquid metal will be lost from inside the frame and the resulting solidified particles might be a source of rattling noises.

With the racket frame of this invention, there is no problem associated with foam escaping from stringing holes during the filling operations where the stringing holes are isolated within the pillars since they will be inaccessible to the foam.

Racket frames of the invention can be made by an injection-moulding process involving a destructible core and it is preferred to use a core that can be melted below the softening point of the set plastics material of the frame. The use of a core of this type in the moulding of a hollow article made from thermoplastic material is known and is described for example in British Patent Specification No. 828,685. Basically, the principle involved is to make an appropriately-shaped core of fusible material (metal in British Pat. No. 828,685) whose melting point is lower than the temperature achieved in the injection-moulding cycle. Due to the thermal conductivity of the core, the moulding is effected before the metal reaches its melting point. Alternatively, the core can be cooled by heat exchange during the moulding cycle to prevent its melting. Once the moulded article has set, the temperature can be raised sufficiently to melt the core but insufficiently to melt or distort the moulding.

Accordingly a further aspect the invention provides a method of making a frame for a games racket, the frame comprising a head and a shaft, in which at least the head is formed by injecting a thermoplastics material around a fusible core, the core having a melting point below the injection temperature and being shaped to provide internal support means between that wall of the moulding that is to lie at the outer crcumference of the head and that wall of the moulding that is to lie at the inner circumference of the head, allowing the moulding to set and then raising the temperature to an amount sufficient to melt the core but insufficient to melt or deform the moulding.

The core is preferably of fusible metal although other low-melting point materials could be used. Suitable metals include, for example Wood's Metal (which is an alloy of lead, tin, bismuth and cadmium) and the commercially available types sold under the trade names Cerrobend (whose melting point is about 70° C.), Cerrocast (160°–170° C.) and Cerromatrix (165°–175° C.). (Cerrobend, Cerrocast and Cerromatrix are all Registered Trade Marks).

The core may be made, for example, by gravity-casting or diecasting, the latter being preferred. It could, alternatively, be made by extrusion and bending to the appropriate shape. It will be appreciated that in the case of extrusion it will be necessary to drill any holes that are required through the core whereas this will not be necessary by casting where the holes can be formed during the casting process.

It is preferred, as indicated above, that the support means in the product be in the form of a centrally-disposed row of hollow pillars, each pillar extending from the wall at the outer circumference to the wall at the inner circumference of the head. This is achieved during the injection-moulding stage by positioning pins in the injection mould to pass through holes formed in the core, the pins being of smaller diameter than the holes whereby the plastics material can flow around the pins to form the walls of the pillars. Thus the pillars are integrally moulded.

In another embodiment, the core may be shaped to provide an integrally-moulded support means in the form of a series of projections extending inwardly from the sidewalls of the frame.

The invention is further described with reference to the accompanying drawings in which.

Figure 1:
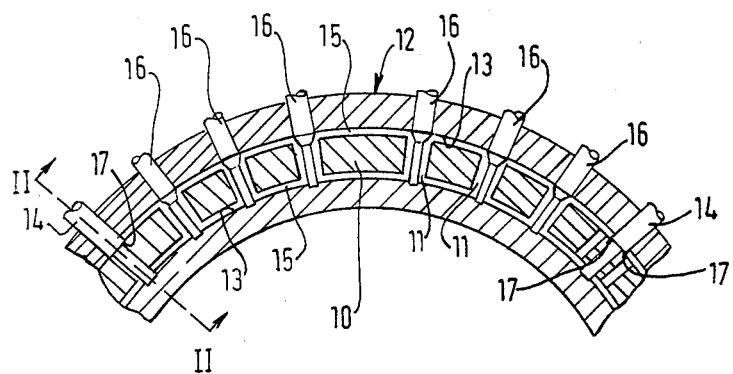
FIG. 1 is a vertical section through a portion of an injection mould containing a metal core for a racket frame.
Figure 2:
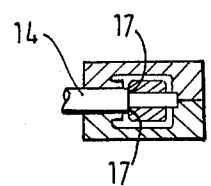
FIG. 2 is a section along line II—II of FIG. 1.

FIG. 1 for convenience illustrates that portion only of a mould core and injection mould that corresponds to the crown or top portion of a racket frame.

A core 10 of fusible metal (e.g. Cerrocast, available from Mining and Chemical Products Limited, Birmingham) is made by die-casting. It has the desired loop shape of the racket head and may also, if desired, extend to include a portion corresponding to the shaft of the racket. It is formed with a series of holes 11 running through the head portion transverse to the loop, these corresponding to the desired positions of the stringing holes of the racket frame.

The core 10 is positioned inside a suitable-dimensioned and shaped injection mould 12 and is held in the required position in the moulding chamber 13 by retractable locating pins 14. A gap 15 is thereby left surrounding the core and between it and the walls of the chamber 13, the gap corresponding to the desired walls of the frame moulding. A pin passes through each hole in the core. The majority of the pins 16 are of diameter less than that of the holes in the core whereby the walls of the supporting pillars of the eventual frame can be formed. Every few inches along the core, say six inches, a locating pin 14 is used which is of larger diameter and which completely fills its hole in the core. These larger diameter pins are provided with shoulders 17 to abut the core around the hole. The shoulders 17 are positioned to be on the opposite side of the core to the injection ports (not shown) of the mould and thereby firmly hold the core in position against the injection pressure. The injection ports are preferably on the inside of the head loop. These larger diameter pins 14 of course result in pillarless holes of larger diameter than those through the pillars. These larger holes in the product can be subsequently lined with grommets, e.g. of plastics material. The locating pins are preferably positioned adjacent the injection ports of the mould. (It may in fact be found unnecessary to have the locating pins all around the core. Four locating pins, one on each side in the shoulder area and in the crown area may be found to be sufficient).

Fibre-reinforced thermoplastics material (nylon 6,6 incorporating 30% by weight of carbon fibres, for example, which is obtainable from Liquid Nitrogen Processing Corp. of Pennsylvania, U.S.A. under their reference RC-1006) is then injected into the mould and allowed to set.

The pins 14 and 16 are retracted and the moulding, with its core, is removed from the mould.

Figures 3, 4:
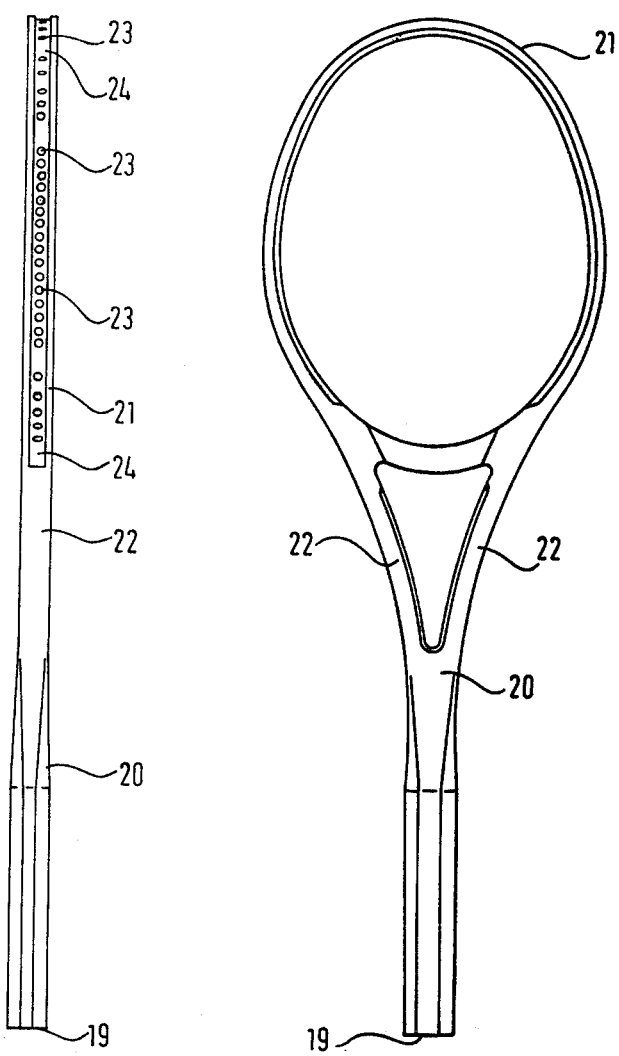
FIG. 3 is an elevation of a moulded racket frame of the invention.
FIG. 4 is a side view of the frame of FIG. 3.

A number of mouldings with their cores are batch-annealed in for example, a forced-air oven. The temperature of annealing is sufficient to melt the metal cores and the molten metal runs out of appropriately-positioned holes in the mouldings into suitably placed containers. For example suitable drain holes could conveniently be provided, where head and shaft portions are integrally-formed, by designing the mould to leave open the end 19 of the shaft 20 remote from the head 21 (see FIGS. 3 and 4). The mouldings can then be annealed while hanging with end 19 end lowermost. Thus the heating step to melt the core can very conveniently be combined with an annealing step which may be desirable to remove internal strains from the moulding.

One form of possible moulded frame is shown in FIGS. 3 to 6. It has a head loop 21 for stringing and arms 22 joining the head to a shaft 20. Head loop 21 has stringing holes 23 in a recessed groove 24 running around its outer circumference.

Figure 5:
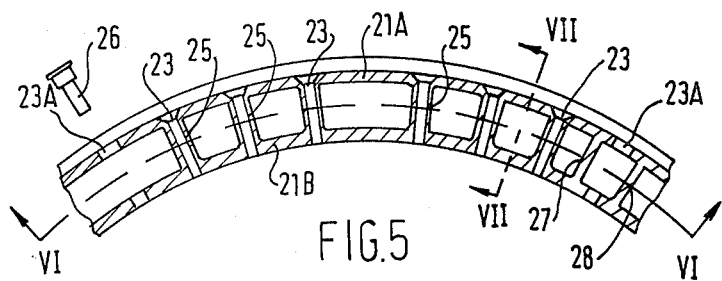
FIG. 5 is a vertical section through a portion of the frame of FIG. 3.
Figure 6:
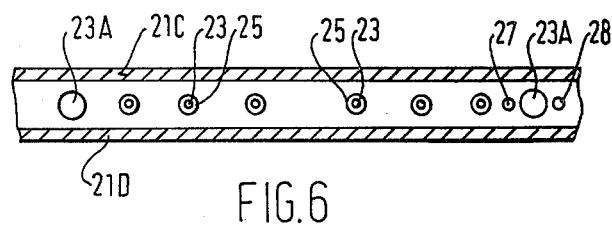
FIG. 6 is a section along line VI—VI of FIG. 5.
Figure 7:
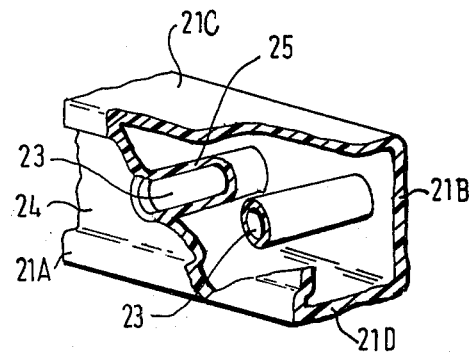
FIG. 7 is a sectional view with parts cut away along line VII—VII of FIG. 5.

As will be seen from the sectional views of FIGS. 5, 6 and 7, the frame is of a hollow, box-like construction having outer wall 21A, inner wall 21B (i.e. with respect to the head loop) and sidewalls 21C and 21D. Hollow pillars 25 define the stringing holes 23 and provide support between outer wall 21A and inner wall 21B. Pillars 25 and holes 23 correspond to the positions of pins 16 of the core 10 of FIG. 1. Larger diameter stringing holes 23A correspond to the positions of locating pins 14 of the core 10 of FIG. 1. The construction of FIG. 5 is also shown with solid pillars 27 and 28, one on each side of larger hole 23A. These solid pillars are an optional feature to add reinforcement to the frame section near to the larger holes. They are formed by the use of corresponding holes (not shown) in core 10 without pins. The larger holes 23A are conveniently lined with grommets such as that shown at 26.

Figure 8:
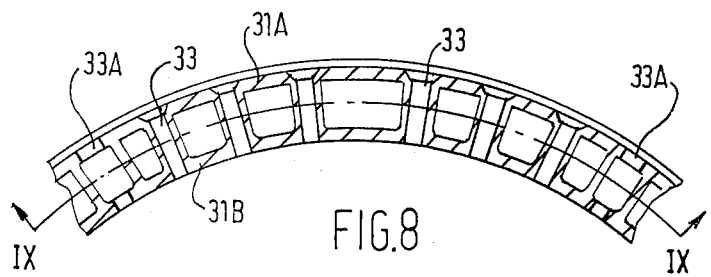
FIGS. 8, 9 and 10 are similar views to FIGS. 5, 6, and 7 respectively but showing an alternative form of supporting pillar.
Figure 9:
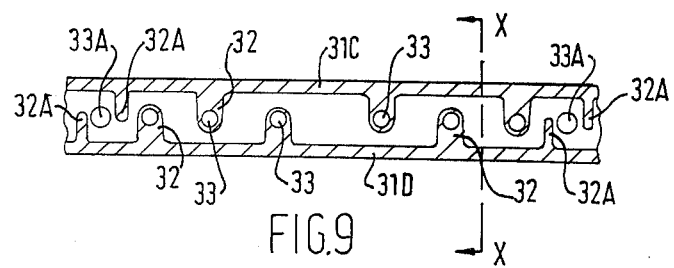
Figure 10:
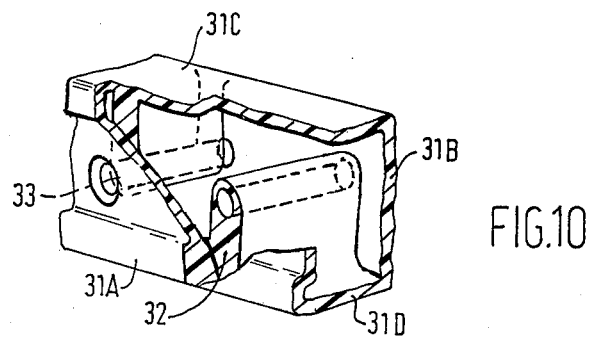

FIGS. 8, 9 and 10 show similar views to FIGS. 5, 6 and 7 respectively but of a racket having pillars in the form of abutments or buttresses extending inwardly from the sidewalls instead of a centrally disposed row of pillars.

The frame is again of a hollow, box-like construction having outer wall 31A, inner wall 31B and sidewalls 31C and 31D. Buttresses 32 extend inwardly from alternate sidewalls. Stringing holes 33 pass through the buttresses. Larger diameter stringing holes 33A correspond to the position of locating pins during the moulding and these are reinforced by the positioning of unperforated buttresses 32A, one on each side of each hole 33A.

Any required finishing operations may be performed as desired after the annealing steps e.g. fitting handles if they are not integrally-formed, covering the handle end of the shaft portion, painting and stringing.

The use of retractable pins in an injection mould is well known and their mode of operation and general design features are well understood in the injection-moulding art. In the process of the present invention it is preferred to use pins which seat in appropriately-shaped depressions in the opposite wall of the moulding chamber when they are in the non-retracted, moulding position. In other words, the pins are retractable through one wall of the moulding chamber and in the extended position seat in depressions in the opposite wall.

As indicated above, in the case where larger diameter locating pins are used, it may be found desirable to provide additional reinforcement at either side of each larger diameter hole that is formed in the moulding. This can be achieved by forming the core with a "secondary" hole at each side of the holes that are to receive these locating pins but not providing pins to pass through these secondary holes. By this means a solid pillar will be formed just before and just after each pillarless hole as you pass along the length of the moulding.

Having now described my invention what I claim is:

1. A method of making a frame for a games racket, said frame comprising a head and a shaft, in which at least said head is a molding formed by the steps of placing a fusible core material in a mold, said fusible core material containing holes oriented in a radial direction from the center of said mold, placing a plurality of pins in said injection mold, said pins passing centrally through at least some of the holes in said core material, said pins having a smaller diameter than said holes, injecting a thermoplastics material into said mold around said fusible core, said core having a melting point below the injection temperature, the holes of said core causing the injected thermoplastics material to form internal support means between the wall of said molding that is to lie at the outer circumference of said head and that wall of said molding that is to lie at the inner circumference of said head, at least some of said support means being hollow due to the presence of said pins, allowing said molding to set, removing said pins from the core, raising the temperature of said molding to an amount sufficient to melt said core but insufficient to melt or deform said molding, and, removing the molten core from said molding.

2. A method according to claim 1, in which the holes of said fusible core material are positioned such that said internal support means is made in the form of a row of hollow pillars centrally disposed in the direction of the thickness of said head.

3. A method according to claims 1 or 2, in which locating pins are positioned in the mold in the shoulder and crown areas of said frame, these locating pins passing through holes through said core which they completely fill.

4. A method according to claim 3 wherein holes are formed in said molding by said pins and grommets are inserted into at least some of said molding holes.

5. A method of making a frame for a games racket, said frame comprising a head and a shaft, in which at least said head is a molding formed by injecting a thermoplastics material around a fusible core provided in a mold, said core having a melting point below the injection temperature and being shaped to cause the injected thermoplastics to form internal support means between that wall of said molding that is to lie at the outer circumference of said head and that wall of said molding that is to lie at the inner circumference of said head, said internal support means being formed by said core as a series of abutments projecting from a sidewall of said molding which interconnects said inner and outer circumferential walls, at least some of said abutments being formed as hollow portions extending between said inner and outer circumference walls by pins which are passed through portions of said core, allowing said molding to set, then raising the temperature of said molding to an amount sufficient to melt said core but insufficient to melt or deform said molding, and, removing the molten core from said molding.

6. A method according to claims 5 in which said abutments alternately extend from opposite sidewalls of said molding which interconnect said inner and outer circumference walls.

7. A method according to claims 1 or 5 in which at least the head of said frame is foam filled in the areas of said core after said molten core is removed.

* * * * *